United States Patent
Zhai et al.

(10) Patent No.: US 10,708,623 B2
(45) Date of Patent: *Jul. 7, 2020

(54) IN LOOP CHROMA DEBLOCKING FILTER

(71) Applicant: Apple Inc., Cupertino, CA (US)

(72) Inventors: Jiefu Zhai, San Jose, CA (US);
Dazhong Zhang, Milpitas, CA (US);
Xiaosong Zhou, Campbell, CA (US);
Chris Y. Chung, Sunnyvale, CA (US);
Hsi-Jung Wu, San Jose, CA (US);
Peikang Song, San Jose, CA (US);
David R. Conrad, Sunnyvale, CA (US); Jae Hoon Kim, San Jose, CA (US); Yunfei Zheng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,744

(22) Filed: Jul. 31, 2018

(65) Prior Publication Data

US 2018/0338161 A1 Nov. 22, 2018

Related U.S. Application Data

(63) Continuation of application No. 14/290,873, filed on May 29, 2014, now Pat. No. 10,038,919.

(51) Int. Cl.
*H04N 19/82* (2014.01)
*H04N 19/186* (2014.01)

(52) U.S. Cl.
CPC ........... *H04N 19/82* (2014.11); *H04N 19/186* (2014.11)

(58) Field of Classification Search
CPC ..... H04N 19/182; H04N 19/196; H04N 19/82
See application file for complete search history.

(56) References Cited

U.S. PATENT DOCUMENTS

| 2012/0236936 A1* | 9/2012 | Segall ................ H04N 19/105 375/240.08 |
|---|---|---|
| 2013/0034169 A1 | 2/2013 | Sadafale et al. |
| 2013/0094572 A1 | 4/2013 | Van der Auwera et al. |
| 2013/0101035 A1 | 4/2013 | Wang et al. |
| 2013/0170562 A1 | 7/2013 | Van der Auwera et al. |

(Continued)

OTHER PUBLICATIONS

The International Telecommunication Union, "High Efficiency Video Coding: Recommendation ITU-T H. 265," Series H: Audio-visual and Multimedia Systems: Infrastructure of Audiovisual Services—Coding of Moving Video, Apr. 2013, Switzerland, 317 pages.

*Primary Examiner* — Farzana Hossain
(74) *Attorney, Agent, or Firm* — BakerHostetler

(57) ABSTRACT

Chroma deblock filtering of reconstructed video samples may be performed to remove blockiness artifacts and reduce color artifacts without over-smoothing. In a first method, chroma deblocking may be performed for boundary samples of a smallest transform size, regardless of partitions and coding modes. In a second method, chroma deblocking may be performed when a boundary strength is greater than 0. In a third method, chroma deblocking may be performed regardless of boundary strengths. In a fourth method, the type of chroma deblocking to be performed may be signaled in a slice header by a flag. Furthermore, luma deblock filtering techniques may be applied to chroma deblock filtering.

15 Claims, 8 Drawing Sheets

(56) References Cited

U.S. PATENT DOCUMENTS

| | | |
|---|---|---|
| 2013/0202048 A1 | 8/2013 | Kim et al. |
| 2013/0251050 A1 | 9/2013 | Ikeda et al. |
| 2013/0251051 A1 | 9/2013 | Ikai |
| 2013/0259118 A1 | 10/2013 | Fu et al. |
| 2014/0036991 A1 | 2/2014 | Chao et al. |
| 2014/0072057 A1 | 3/2014 | Tourapis et al. |
| 2014/0146875 A1 | 5/2014 | Chong et al. |
| 2014/0192904 A1 | 7/2014 | Rosewarne |
| 2014/0328413 A1 | 11/2014 | Esenlik et al. |
| 2015/0016550 A1 | 1/2015 | Kim et al. |
| 2015/0085929 A1 | 3/2015 | Chen et al. |
| 2015/0085935 A1 | 3/2015 | Chen et al. |
| 2015/0264406 A1 | 9/2015 | Kim et al. |

\* cited by examiner

100

200

400

500

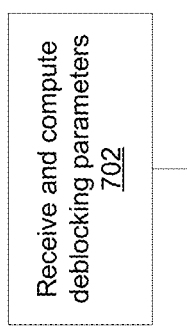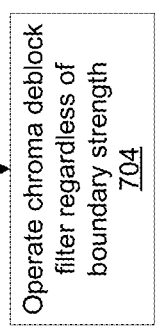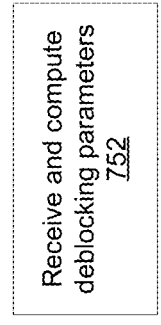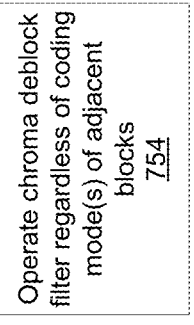
FIG. 7A
700
FIG. 7B
750
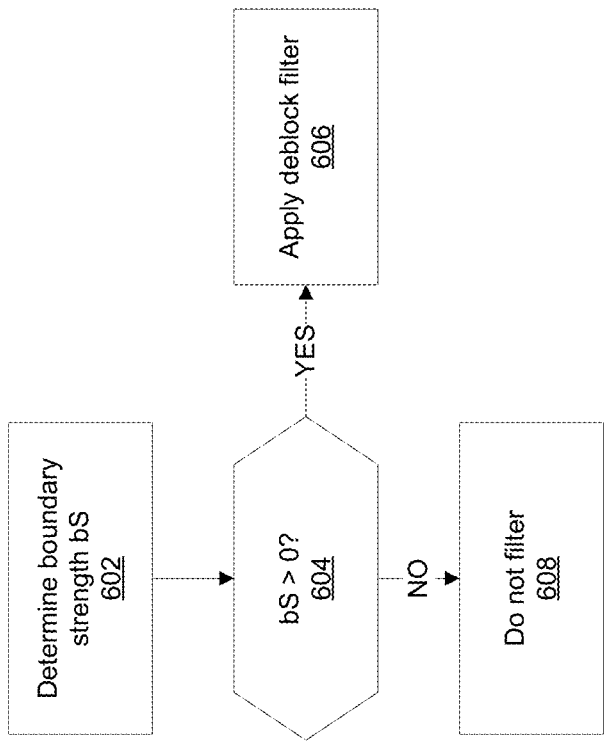
FIG. 6
600

800

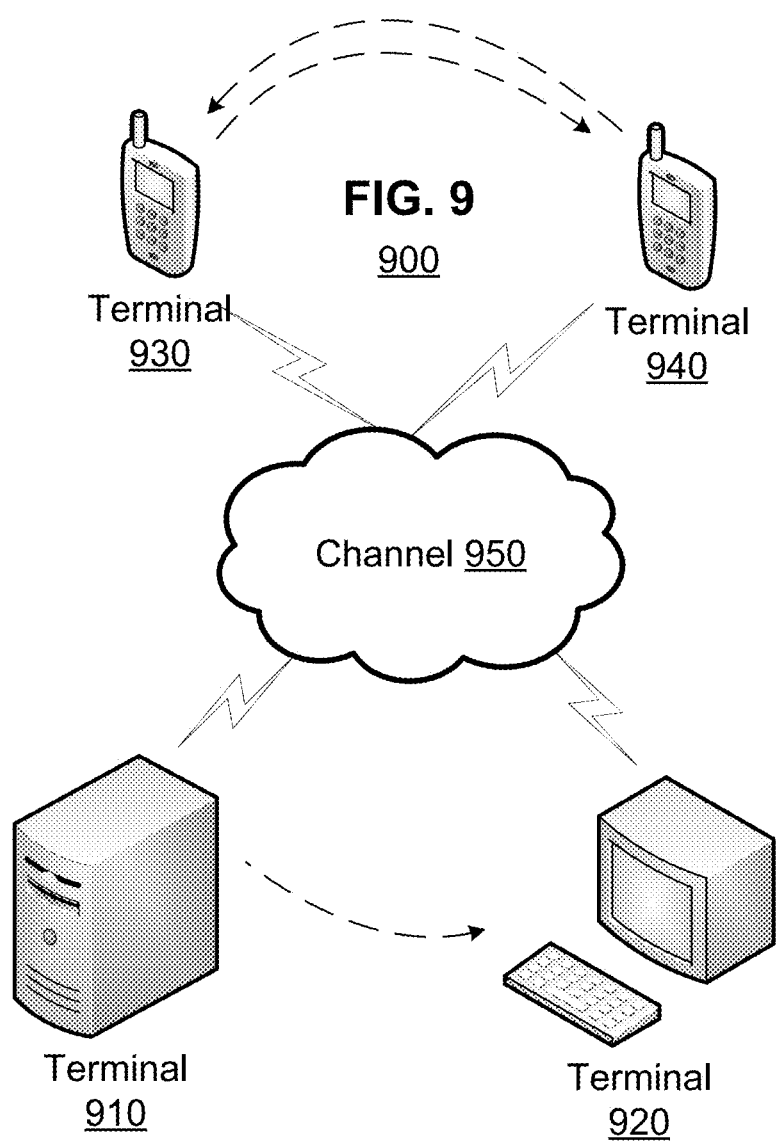

IN LOOP CHROMA DEBLOCKING FILTER

CROSS-REFERENCE TO RELATED APPLICATIONS

This application is a continuation of U.S. patent application Ser. No. 14/290,873, filed May 29, 2014, now U.S. Pat. No. 10,038,919, the disclosure of which is hereby incorporated by reference in its entirety.

BACKGROUND

The present invention relates to methods of reconstructing signal amplitudes for video coding and compression. More specifically, it relates to methods for chroma deblock filtering processes in video coding and processing systems such as within the High Efficiency Video Coding (HEVC) standard.

The HEVC standard, currently published as ISO/IEC 23008-2 MPEG-H Part 2 and ITU-T H.265, introduced several new video coding tools designed to improve video coding efficiency over previous video coding standards and technologies, including, but not limited to MPEG-2, MPEG-4 Part 2, MPEG-4 AVC/H.264, VC1, and VP8.

One of the tools introduced in the HEVC standard is deblocking (also referred to as "deblock filtering"), which is a filtering mechanism performed to reduce the appearance of "blockiness" by smoothing out artifacts caused by blockwise processing. Blockiness artifacts commonly occur at block boundaries, thus deblocking modifies boundary sample values to remove blockiness artifacts. The boundary samples of adjacent coding units are smoothed to reduce the transitions between coding units. Deblock filtering under the HEVC standard is applied for both luma and chrominance (chroma) components of reconstructed video samples. Under the HEVC standard, deblock filtering processes for luma components is different from deblock filtering processes for chroma components. In particular, chroma components typically undergo a simplified deblock filtering process compared with luma components.

Under the HEVC standard deblocking scheme, luma components are subject to one type of deblock filtering, and chroma components are subject to another type of deblock filtering. Under the HEVC standard scheme for chroma deblock filtering, color artifacts, sometimes severe, may result. The color artifacts may result from differing filter strengths by which luma and chroma deblocking is applied, the sample grid sizes on which chroma deblocking is applied, and the limited modes in which chroma deblocking is applied. For instance, deblock filtering is typically applied to samples adjacent to a (PU) or a (TU) boundary, i.e., edges that are aligned on an 8×8 sample grid, for both luma and chroma samples. Thus, for chroma samples, deblock filtering may be performed on a 16×16 boundary in a typical 4:2:0 sampling structure. Additionally, chroma deblocking is performed only when one of two adjacent coding units use intra mode prediction. Furthermore, the filter size is relatively large, which provides weak filtering by only affecting one pixel at each side of an edge.

With respect to deblock filter strength, the HEVC specification defines three strength levels: no filtering, strong filtering, and weak filtering. A strong filter (i.e., strength level of 2) is applied when one of two adjacent blocks is intrapicture predicted. A weak filter (i.e., strength level of 1) is applied when P or Q has at least one nonzero transform coefficient, the reference indices of P and Q are not equal, the motion vectors of P and Q are not equal, or a difference between a motion vector component of P and Q is greater than or equal to one integer sample. Otherwise no deblock filtering is applied.

Under the HEVC standard, deblock filtering of luma components typically is applied in one of any of the three strengths described above. In contrast, deblock filtering of chroma components is typically applied in one of two strengths described above: no filtering or normal filtering (also referred to as "weak filtering"). The decision of whether to perform deblock filtering on a boundary is based on a boundary filtering strength variable, "bS." bS is typically determined based on a prediction mode used to reconstruct a CU. For example, according to the HEVC standard, when the luma component of a block is intra code, the value of its bS is at least two. According to the filter strength and the average QP, two thresholds, $t_c$ and $\beta$, are determined from predefined tables. For luma samples, the type of filtering performed is selected based on $\beta$ and $t_c$. For chroma samples, only two types of filtering are used: no filtering or normal filtering. The strength level of the filter indicates the number of samples that are modified on each side of a boundary. For example, a normal filter might modify one to two samples on each side a boundary, while a strong filter might modify up to three samples on each side of a boundary. Thus, there exists a need in the art for improved chroma deblock filtering.

BRIEF DESCRIPTION OF THE DRAWINGS

FIG. 6 is a flowchart of a method of chroma deblock filtering, according to an embodiment of the present invention.

FIG. 7A is a flowchart of a method of chroma deblock filtering regardless of boundary strength, according to an embodiment of the present invention.

FIG. 7B is a flowchart of a method of chroma deblock filtering regardless of coding mode(s) of adjacent blocks, according to yet another example embodiment.

FIG. 9 is a block diagram of a multi-terminal system according to an embodiment of the present invention

DETAILED DESCRIPTION

By perceiving the limitations of current deblock filtering techniques, the inventors have developed methods for deblock filtering of chroma components that address the limitations of the existing chroma deblock filtering. The chroma deblock filtering may be implemented in software or hardware before and/or after SAO filtering. The chroma deblocking may receive an array of picture samples and corresponding quantization parameters. Based on the quantization parameters, chroma deblocking may be applied to each sample except for those samples bordering LCUs that have not yet been received. The chroma deblocking may be performed in a pipelined fashion such that each sample is deblocked as it is received. In contrast to existing methods, the entire array of picture samples need not be coded before performing deblocking on a sample. In this manner, boundary strengths and coding modes of adjacent samples need not be known and/or calculated to perform chroma deblocking. Chroma deblocking may also be performed according to luma deblocking techniques.

Figure 1:
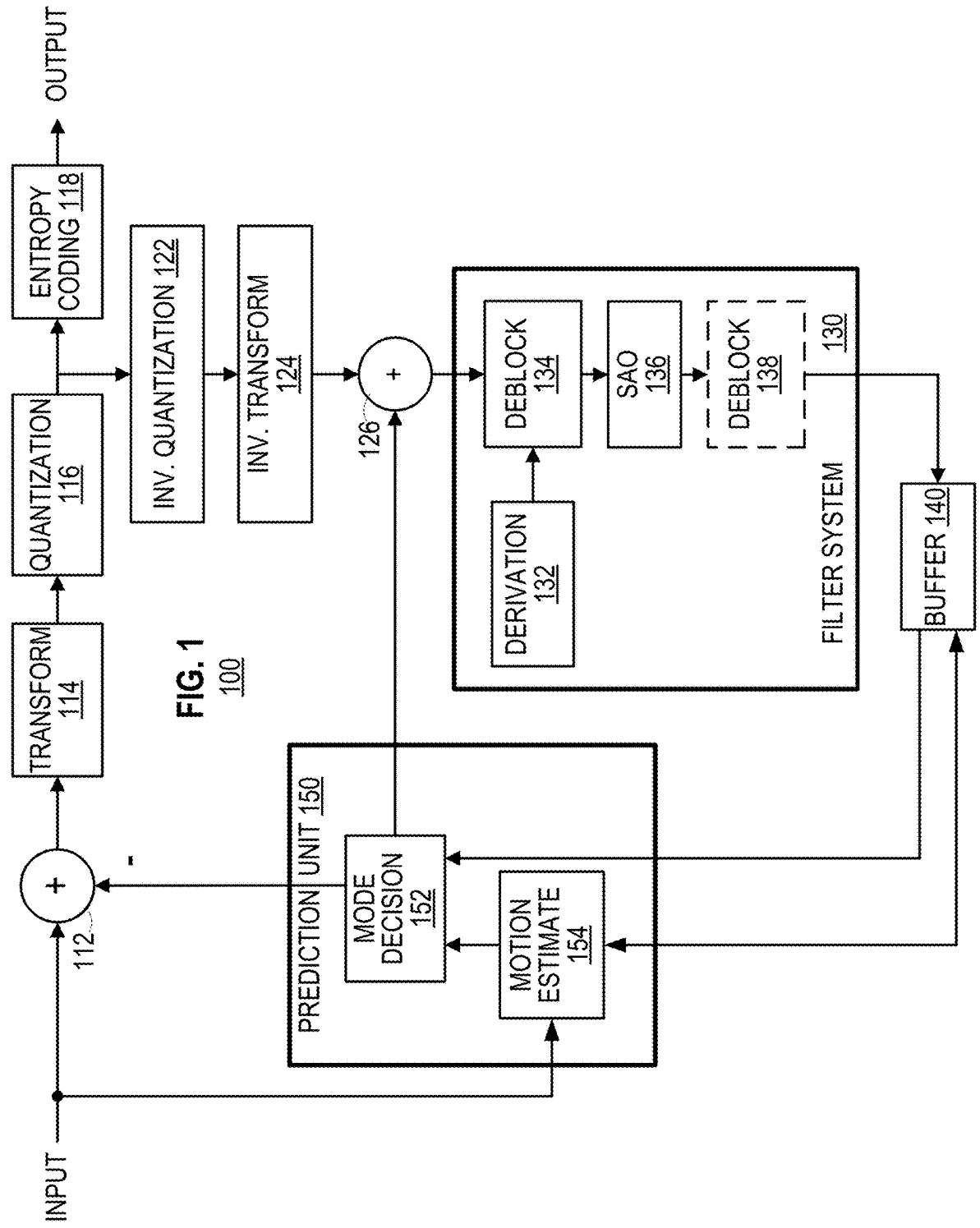
FIG. 1 is a simplified block diagram of a video coding system.

FIG. 1 shows a simplified block diagram of a coding system 100 in an exemplary embodiment of the invention that includes components for encoding and decoding video data. The system 100 may include a subtractor 112, a transform unit 114, a quantizer 116, and an entropy coding unit 118. The subtractor 112 may receive an input motion compensation block from a source image and, depending on a prediction mode used, a predicted motion compensation block from a prediction unit 150. The subtractor 112 may subtract the predicted block from the input block and generate a block of pixel residuals. If no prediction is performed, the subtractor 112 simply may output the input block without modification.

The transform unit 114 may convert the block it receives to an array of transform coefficients according to a spatial transform, typically a discrete cosine transform ("DCT") or a wavelet transform. The quantizer 116 may truncate transform coefficients of each block according to a quantization parameter ("QP"). The QP values used for truncation may be transmitted to a decoder in a channel. The entropy coding unit 118 may code the quantized coefficients according to an entropy coding algorithm, for example, a variable length coding algorithm or context-adaptive binary arithmetic coding. Additional metadata may be added to or included in the coded data, for example, data that identifies prediction decisions made by the encoder, which may be output by the system 100.

The system 100 also may include an inverse quantization unit 122, an inverse transform unit 124, an adder 126, a filter system 130, a buffer 140, and a prediction unit 150. The inverse quantization unit 122 may quantize coded video data according to the QP used by the quantizer 116. The inverse transform unit 124 may transform re-quantized coefficients to the pixel domain. The adder 126 may add pixel residuals output from the inverse transform unit 124 with predicted motion data from the prediction unit 150. The summed output from the adder 126 may output to the filtering system 130.

The filtering system 130 may include a strength derivation unit 132, one or more deblocking filters 134, 138, and a sample adaptive offset (SAO) filter 136. The filters in the filtering system may be applied to reconstructed samples before they are written into a decoded picture buffer 140 in a decoder loop. Alternatively, the filtering may be performed as post-processing operations. The strength derivation unit 132 may derive a strength value. The one or more deblocking filters 134, 138 may apply deblock filtering to recover video data output from the adder 126 at a strength provided by the strength derivation unit 132. The one or more deblocking filters 134, 138 may be configured to perform at least one of the deblock filtering techniques described herein, and in some instances may perform different combinations of two or more of the deblocking features described herein to remove the appearance of "blockiness" artifacts for a frame, which may occur at boundaries between blocks (e.g., PU or TU boundaries). The SAO filter 136 may add an offset value to each decoded sample before or after application of the deblocking filter 134.

In some embodiments, an optional deblocking filter 138 may be provided to perform filtering after application of the SAO filter 136. The deblocking filter 138 may be provided in addition to or as a replacement for the deblocking filter 134. If boundary strength is not made available after SAO filtering, performing deblock filtering after SAO filtering may prevent over-smoothing of edges and textures of an image. If deblock filtering is provided after SAO filtering, the filtering may be applied to a reference frame, which may be more easily implemented in hardware or firmware compared with deblock filtering before SAO filtering. The filtering system 130 may also include other types of filters, but these are not illustrated in FIG. 1 to simplify presentation of the present embodiments of the invention.

A classifier index specifying classification of each sample and offsets of the samples may be encoded by entropy coder 118 in a bitstream. In a decoding processor, the classifier index and offsets may be decoded by a corresponding decoder to select filtering parameters that are applied to decoded data. The buffer 140 may store recovered frame data (not shown) as output by the filtering system 130. The recovered frame data may be stored for use as reference frames during coding of later-received blocks.

The prediction unit 150 may include a mode decision unit 152 and a motion estimator 154. The motion estimator 154 may estimate image motion between a source image being coded and reference frame(s) stored in the buffer 140. The mode decision unit 152 may assign a prediction mode to code the input block and select a block from the buffer 140 to serve as a prediction reference for the input block. For example, it may select a prediction mode to be used (for example, uni-predictive P-coding or bi-predictive B-coding), and generate motion vectors for use in such predictive coding. In this regard, prediction unit 150 may retrieve buffered block data of selected reference frames from the buffer 140.

The coding system 100 may operate on video frames that have been partitioned into coding blocks or units ("CU"), and, thus, the system 100 may operate on a CU-by-CU basis. In an HEVC implementation, partitioning initially divided frame content into 64 pixel by 64 pixel largest coding units ("LCUs"), but may partition the LCUs recursively into smaller CUs. The principles of the present invention work on CUs of any size. Alternatively, the input to the coding system 100 may already be partitioned. For example, an input block may be a largest coding unit ("LCU"), which is also known as a coding tree unit or ("CTU"). The LCU may be partitioned into smaller CUs. The CUs are the basic units on which the techniques discussed herein may be applied. The CUs are typically rectangular regions, and may be of varying sizes. For example, for a given frame, regions coded at a higher coding quality may user smaller-sized coding units than regions coded at a lower coding quality.

A CU is typically made up of one luma component and two chrominance (chroma) components. The luma component represents the brightness of the sample and the chroma components represent the hues of the sample. In a typical 4:2:0 sampling structure, each chroma component has one-fourth the number of samples of the luma component (half the number of samples in both the horizontal and vertical dimensions).

A CU may be associated with at least one prediction unit (PU) and at least one transform unit (TU). A PU may describe how data for a CU is predicted and instructions for retrieving a reference sample for the PU. A TU may correspond to a set of residual data to which a transform is applied. For example, subtractor 112 may generate a set of delta values from the difference between read data and input data, and a transform may be performed on the set of delta values. The size of the TU may be the same as the size of the CU, or a CU may be partitioned into several TUs. For example, a transform may be performed for part of an array of luma samples, while another transform is perform for another part of the array of luma samples.

According to embodiments of the present invention, deblocking may be performed LCU-by-LCU without needing to read all of the LCUs before performing deblock filtering. For example, deblocking may be scheduled such that a LCUs are coded in a raster scan order, e.g., left to right and top to bottom, and deblocking is performed for each LCU at the time that the LCU is read.

Figure 2:
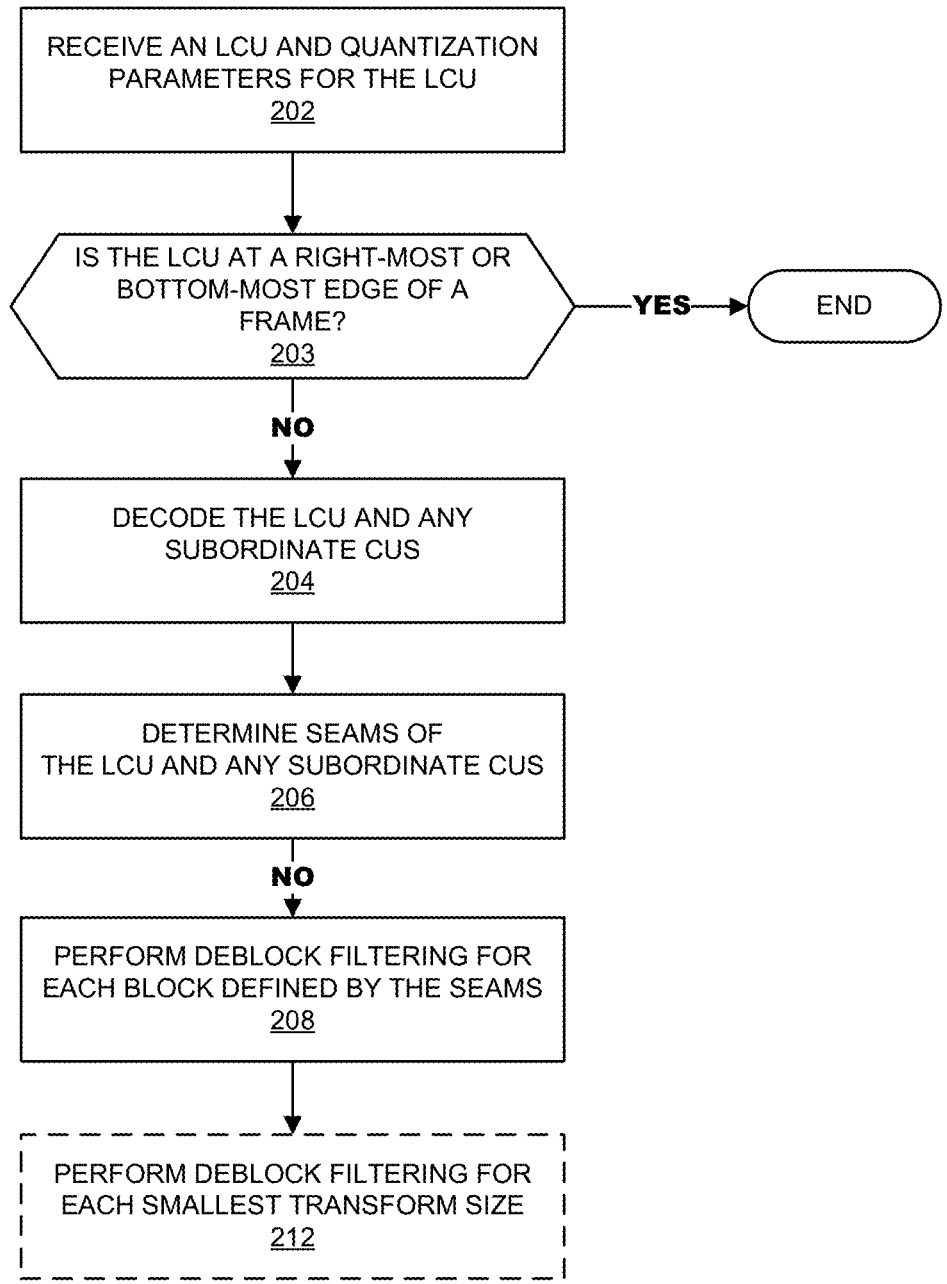
FIG. 2 is a flowchart of a method of chroma deblock filtering, according to an embodiment of the present invention.

FIG. 2 illustrates a method of chroma deblock filtering according to an embodiment of the present invention. In box 202, the method 200 may receive an LCU and quantization parameters for the LCU. The method 200 may then determine whether the received LCU is a right-most of bottom-most edge of a frame. If so, the method 200 may end. Otherwise, the method 200 may proceed to box 204 in which the LCU and any subordinate CUs are decoded. Based on the decoding, the method 200 may determine seams of the LCU and subordinate CUs (box 206). Chroma deblock filtering may be performed for each block defined by the determined seams. IN some instances, the method 212 may deblock each smallest transform size (box 212). Method 200 may thus perform deblock filtering in a pipelined process with the aid of the received quantization parameters as further discussed herein. As each LCU is decoded, deblock filtering is performed, without reading all of the LCUs in a frame before performing deblock filtering. Boxes 202-212 may be repeated for each LCU of a frame.

In box 203, the method determines whether the LCU is at a right-most of bottom-most edge of a frame, because, given that the LCUs in a bitstream are read in a raster scan order, image information of LCUs to the right of and below the edge LCUs have not yet been received and are not yet known. In some instances, the method 200 may not know the seams of the LCU, but even without information regarding the seams of CUs, may perform deblock filtering on the smallest transform size, e.g., 4×4 chroma samples.

Figure 3:
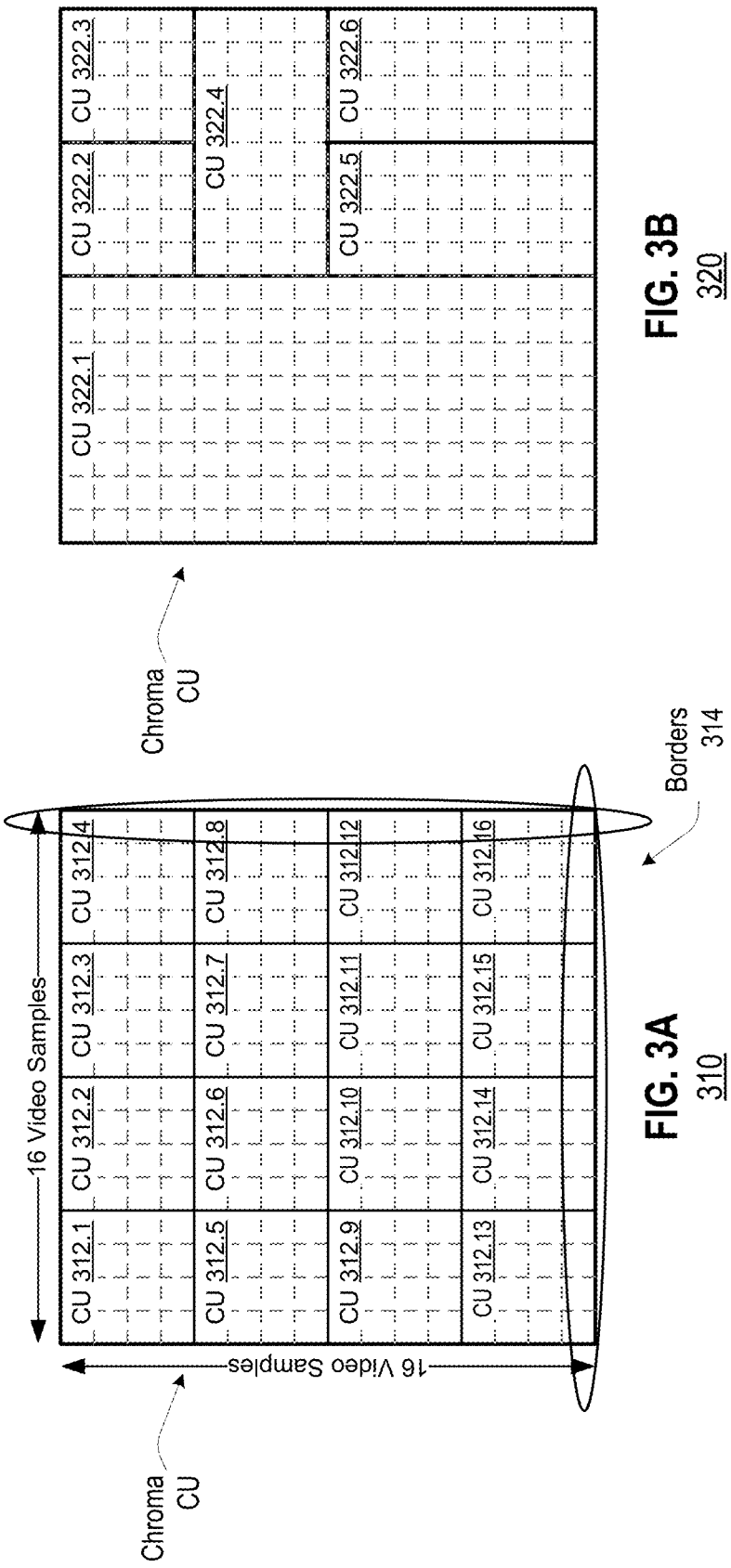
FIG. 3A is a simplified conceptual diagram of a video block of chroma samples including coding units of uniform sizes according to an embodiment of the present invention.
FIG. 3B is a simplified conceptual diagram of a video block of chroma samples including coding units of varying sizes according to an embodiment of the present invention.

FIG. 3A is a simplified conceptual diagram of an exemplary chroma block 210 to which the principles of the present invention may be applied. The exemplary chroma video block 210, which is an LCU of size 16×16 chroma samples, may include further sub-divided CUs. The sub-divided CUs 312.1-312.16 may each be of a smallest transform size of 4×4. The deblocking operations may be performed during LCU decoding, and thus may filter all CU boundaries inside the space of the LCUs in which the CUs reside. Deblocking also may be performed at LCU boundaries for when decoded data of neighboring LCUs are present. In the example illustrated in FIG. 3A, chroma deblocking for the right and bottom borders 314 may not be performed until image information of LCUs to the right and below the current CU is received.

Method 200 may be performed on the exemplary chroma video block 210 as follows. In a frame whose LCUs have not yet been decoded, the method 200 may receive CU 312.1 and its corresponding quantization parameters. The method 200 may then determine whether the current CU is a right-most or bottom-most CU. For example, the CUs 312.4, 312.8, 312.12, and 312.13-312.16 are part of the borders 314, which may cause the method 200 to terminate upon evaluation in box 203. Because the current CU 312.1 is not part of the border 314, the method 200 may proceed to box 204 in which CU 312.1 is decoded along with any subordinate CUs. The method 200 may determine seams of the CU 212.1 (box 206). Chroma deblock filtering may be performed for each block defined by the determined seams.

FIG. 3B shows an example video block 320 of size 16×16 chroma samples, which includes further sub-divided CUs 322.1-322.6 of non-uniform sizes. FIG. 3B shows that the partition size of the CUs need not be known to perform chroma deblock filtering. In an embodiment, deblock filtering may be performed at each of the CU boundaries or, optionally, performed on smaller sizes. For example, although the further sub-divided CUs 322.1-322.6 are of varying sizes, the smallest transform size may be 4×4 chroma samples. In another embodiment, the CU boundaries may not be known, and deblock filtering may be performed on a smallest transform size. In other words, regardless of partition size and/or the presence of edges, chroma deblock filtering may be performed for a smallest transform size (4×4 chroma samples).

The filtering order for the 4×4 boundaries of the LCU may be selected to minimize mismatches between an encoder and a decoder. For example, for the second, third, and fourth example embodiments, all horizontal edges in the LCU may be filtered prior to filtering the vertical edges of the LCU. In the example illustrated in FIG. 2, horizontal edges $H_0$ and $H_1$ may be filtered prior to vertical edges $V_0$ and $V_1$. An approximate order of filtering may be defined and tracked at the frame level, e.g., as defined by the HEVC standard.

Figure 4:
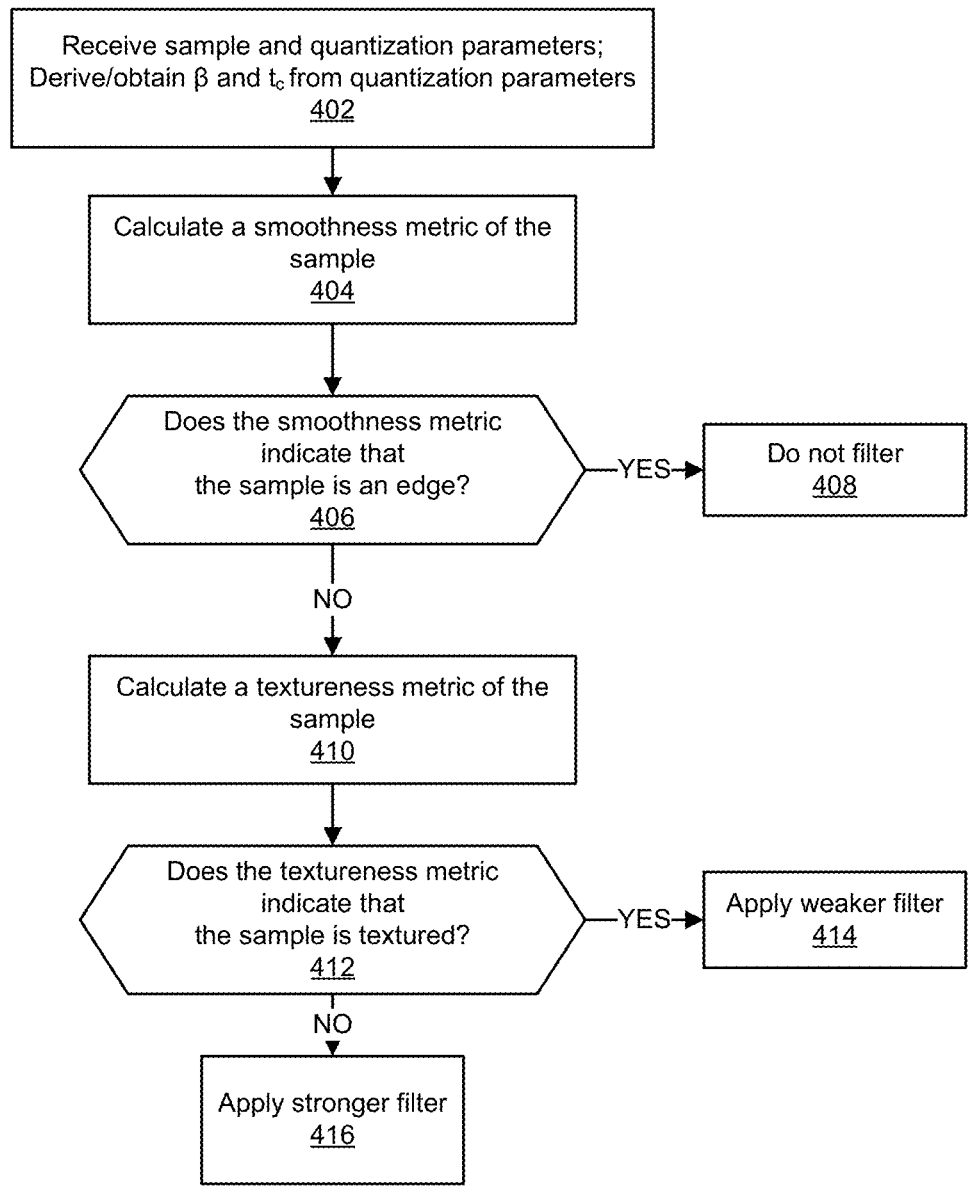
FIG. 4 is a flowchart of a method of chroma deblock filtering in which some of the blocks may include edges and/or textures, according to an embodiment of the present invention.

The principles of applying method 200 on a boundary of a smallest transform size described above may be integrated into the HEVC standard, for example by determining, during a vertical edge filtering process, whether $bS[xDk*2][yDm*2]$ is equal to 2 without determining $((xCb/2+xDk)>>3)<<3$ is equal to $xCb/2+xDk$ in subclause 8.7.2.5.1 of ITU-T H.265, as follows:

The filtering process for edges in the chroma coding blocks of current coding unit consists of the following ordered steps:
1. The variable nD is set equal to $1 << (\log 2CbSize-3)$.
2. For $xD_k$ equal to $k<<2$ with k=0 . . . nD−1 and $yD_m$ equal to $m<<2$ with m=0 . . . nD−1, the following applies:
   When $bS[xD_k*2][yD_m*2]$ is equal to 2, the following ordered steps apply:

Similarly, the principles of applying method 200 to a boundary of a smallest transform size described above may be integrated into the HEVC standard by determining, during a horizontal edge filtering process, whether $bS[xDk*2][yDm*2]$ is equal to 2, without determining whether $bS[xDk*2][yDm*2]$ is equal to 2 without determining $((yCb/2+yDm)>>3)<<3$ is equal to $yCb/2+yDm$ in subclause 8.7.2.5.2 of ITU-T H.265, as follows:

The filtering process for edges in the chroma coding blocks of current coding unit consists of the following ordered steps:

1. The variable nD is set equal to 1<<(log 2CbSize−3).
2. For $yD_m$ equal to m <<2 with m=0 . . . nD−1 and $xD_k$ equal to k<<2 with k=0 . . . nD−1, the following applies:
   When $bS[xD_k*2][yD_m*2]$ is equal to 2, the following ordered steps apply:

FIG. 4 illustrates a method 400 of chroma deblock filtering of samples, some of which may include an edge and/or texture according to an example embodiment of the present invention. In a box 402, the method 400 may derive $t_c$ and β threshold parameters from received QP values. The $t_c$ and β parameters may be determined from predefined tables according to a filter strength and an average QP. If the $t_c$ and β parameters have already been derived for a luma component, e.g., according to the edge filtering process defined by the HEVC standard, they may be obtained and used for chroma deblocking purposes according to method 400. Method 400 may then perform boxes 404 to 416 for each smallest transform size, e.g., each 4×4 boundary sample.

The method 400 may calculate a smoothness metric for a boundary sample in box 404. Based on the smoothness metric, the method 400 may determine whether the boundary is an edge in box 406. If the block boundary is an edge, the method may proceed to box 408 in which the edge is not filtered to preserve the boundary in the resulting frame. To determine whether a boundary is an edge in box 406, the method 400 may determine whether the smoothness metric derived in box 404 exceeds the β threshold value. A smoothness metric greater than β may indicate that a boundary sample is an edge.

If it is determined that a boundary is not an edge, the method 400 may calculate a textureness metric at the boundary in box 410. Based on the textureness metric, the method 400 may determine whether the block boundary is across a texture in box 412. To determine whether a boundary is across a texture in box 412, the method 400 may determine whether the textureness metric derived in box 410 exceeds the $t_c$ threshold value. A textureness metric greater than $t_c$ may indicate that a boundary sample is an across a texture. If the block boundary is across a texture, the method may proceed to box 414 in which a weaker filter is applied. A weaker filter may better retain texture without over-smoothing compared with a stronger filter. Otherwise, if the textureness does not indicate that the block boundary is across a texture, the method 400 may apply a stronger filter to reduce blockiness artifacts (box 416).

According to method 400, chroma deblock filtering may be performed with various filtering strengths. Under the HEVC standard, chroma filtering is only performed in one of two strengths: no filtering and normal filtering. In contrast, according to method 400, chroma deblocking may be selected from any of the filtering strengths defined for luma deblocking under the HEVC standard. For example, filtering strength may be selected between no filtering, weak filtering, and strong filtering. By using the filtering process for the luma channel, over-smoothing of edges and texture may be avoided.

In an embodiment, according to method 400, chroma deblocking may be performed for each block area indicated by a seam. In an alternative embodiment, the method 400 may perform chroma deblocking without considering the coding modes or boundary strengths chosen for adjacent blocks. For example, the method 400 may select a strength of filtering based on a decoded signal itself.

In an embodiment, the determination of whether a block boundary is an edge or whether a block boundary is across a texture may be defined according to the same or similar evaluations performed for luma deblocking. Similarly, a level of filtering that constitutes weak filtering and a level of filtering that constitutes stronger filtering may also be defined by corresponding filtering used for luma deblocking as further discussed herein. In an alternative embodiment, different "weaker" and "stronger" filters may be designed for chroma deblock filtering.

Figure 5:
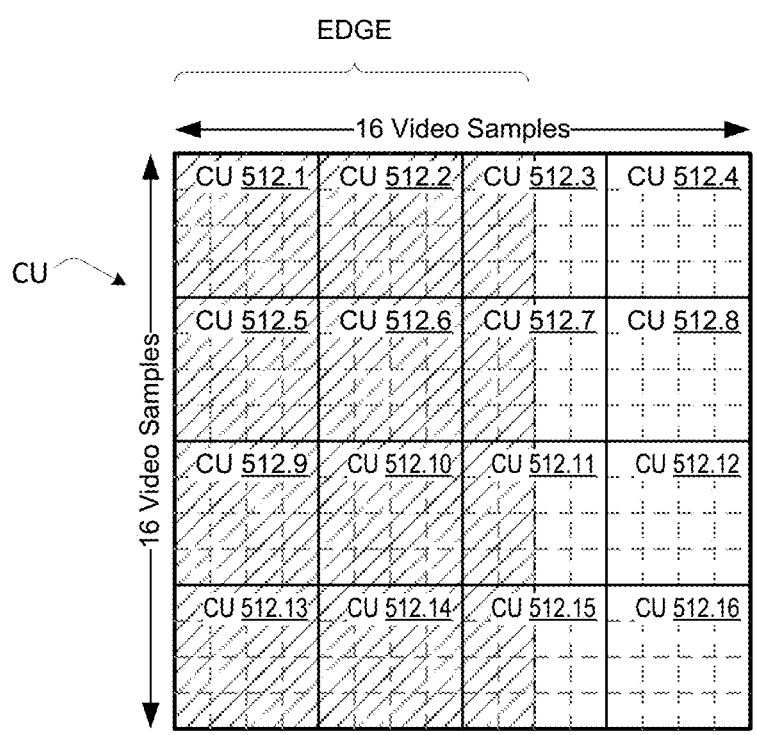
FIG. 5 is a simplified conceptual diagram of a video block of chroma samples including an edge in some of the samples according to an embodiment of the present invention.

FIG. 5 is a simplified conceptual diagram of an exemplary chroma block 500 of in which an edge is present in the video block, and to which the principles of the present invention may be applied. An edge, which may be present in the chroma block, is represented by the shading of video samples 512.1, 512.2, 512.5, 512.6, 512.9, 512.10, 512.13, 512.14, and a portion of 512.3, 512.7, 512.11, and 512.15.

Method 400 may be performed on an exemplary chroma video block 500 as follows. The method 400 may receive a sample, CU 512.1, and its corresponding quantization parameters. The method 400 may calculate a smoothness metric of CU 512.1, and based on the calculated smoothness metric, may determine whether the current CU is an edge. Because the current CU 512.1 is part of the edge (formed by CUs 512.1, 512.2, 512.5, 512.6, 512.9, 512.10, 512.13, 512.14, and a portion of 512.3, 512.7, 512.11, and 512.15), the method 400 may proceed to box 408 in which CU 512.1 is not filtered. As another example, chroma deblocking of CU 512.4, which is not an edge, would cause the method 400 to proceed to box 406, in which the method 400 calculates a textureness metric of CU 512.4. As shown, CU 512.4 is not textured, and thus the method 400 may apply a weaker filter (box 414). Chroma deblock filtering may be performed for each block defined by the determined seams.

FIG. 6 illustrates a method 600 for chroma deblock filtering according to another example embodiment. In this embodiment, chroma deblocking may be applied for lower boundary strengths compared with the HEVC standard scheme. For example, chroma deblocking may be applied when a boundary strength bS is greater than 0. In this way, blurring may be avoided by better detecting real edges. In box 602, method 600 may determine a boundary strength of a sample. The method 600 may then determine whether the boundary strength exceeds 0 (box 604). Responsive to a determination that the boundary strength is greater than 0, the method 600 may apply a chroma deblocking filter, for example according to the techniques described herein or according to the default scheme defined by the HEVC standard. If the method 600 determines in box 604 that that the boundary strength does not exceed 0, the sample may be output without performing chroma deblocking (box 608).

The principles of method 600 may be integrated into the HEVC standard, for example by filtering edges in chroma coding blocks where bS[xDk*2][yDm*2] is greater than 0 in subclause 8.7.2.5.1 of ITU-T H.265, as follows:

The filtering process for edges in the chroma coding blocks of current coding unit consists of the following ordered steps:
1. The variable nD is set equal to 1<<(log 2CbSize−3).
2. For $xD_k$ equal to k<<2 with k=0 . . . nD−1 and $yD_m$ equal to m<<2 with m=0 . . . nD−1, the following applies:
   When $bS[xD_k*2][yD_m*2]$ is greater than 0 and $(((xCb/2+xD_k)>>3)<<3)$ is equal to $xCb/2+xD_k$, the following ordered steps apply:

Similarly, the principles of method 600 may be integrated with the HEVC standard by filtering edges in chroma coding blocks where bS[xDk*2][yDm*2] is greater than 0 in subclause 8.7.2.5.2 of ITU-T H.265, as follows:

The filtering process for edges in the chroma coding blocks of current coding unit consists of the following ordered steps:
1. The variable nD is set equal to 1<<(log 2CbSize−3).
2. For $yD_m$ equal to m<<2 with m=0 . . . nD−1 and $xD_k$ equal to k<<2 with k=0 . . . nD−1, the following applies:
   When $bS[xD_k*2][yD_m*2]$ is greater than 0 and $(((yCb/2+yD_m)>>3)<<3)$ is equal to $yCb/2+yD_m$, the following ordered steps apply:

FIG. 7A illustrates a method 700 for chroma deblock filtering regardless of boundary strength, according to yet another example embodiment. In this embodiment, chroma deblocking may be applied regardless of boundary strength. In this way, chroma deblocking may be applied when boundary strength is unknown or not obtainable. Typically deblock filtering involves computing a boundary strength at filter edge, then operating the deblock filter based on the boundary strength. In contrast, method 700 may perform chroma deblock filtering without calculating and/or knowing a boundary strength. In box 702, method 700 receives and computes deblocking parameters, which parameters need not include boundary strength. The method 700 may then apply the chroma deblocking filter, for example according to the techniques described herein or according to the default scheme defined by the HEVC standard (box 704).

FIG. 7B illustrates a method 750 for chroma deblock filtering regardless of coding mode(s) of adjacent blocks, according to yet another example embodiment. In this embodiment, chroma deblocking may be applied based on a decoded signal, regardless of a coding mode selected for adjacent blocks. In this way, chroma deblocking may be applied when coding modes of adjacent blocks are unknown or not obtainable. In box 752, method 700 receives and computes deblocking parameters, which parameters need not include coding mode(s) of adjacent blocks. The method 750 may then apply the chroma deblocking filter, for example according to the techniques described herein or according to the default scheme defined by the HEVC standard (box 754). Typically deblock filtering involves computing coding modes for a group of adjacent blocks, then operating the deblock filter based on the calculated coding modes of the adjacent blocks, and a strong filter is applied if one of two adjacent blocks is intrapicture predicted. In contrast, method 750 may perform chroma deblock filtering without calculating and/or knowing a coding mode of a neighboring block.

Figure 8:
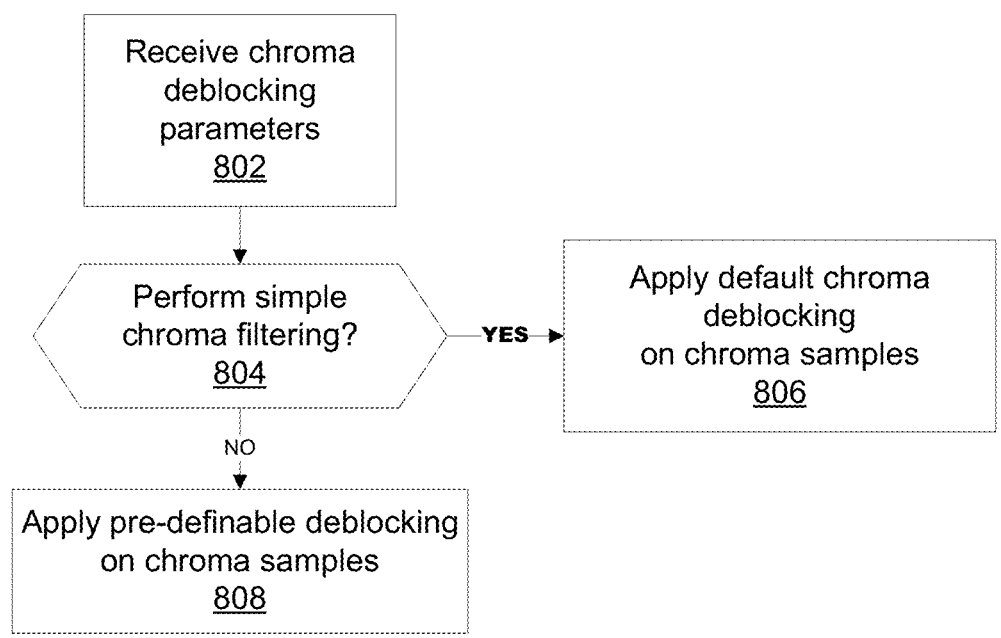
FIG. 8 is a flowchart of a method of chroma deblock filtering, according to an embodiment of the present invention.

The principles of method 700 may be integrated with the HEVC standard by filtering edges in chroma coding blocks where $(((xCb/2+xDk)>>3)<<3)$ is equal to xCb/2+xDk in subclause 8.7.2.5.1 of ITU-T H.265, as follows:

The filtering process for edges in the chroma coding blocks of current coding unit consists of the following ordered steps:
1. The variable nD is set equal to 1<<(log 2CbSize−3).
2. For $xD_k$ equal to k<<2 with k=0 . . . nD−1 and $yD_m$ equal to m<<2 with m=0 . . . nD−1, the following applies:
   When $(((xCb/2+xD_k)>>3)<<3)$ is equal to $xCb/2+xD_k$, the following ordered steps apply:

Similarly, the principles of method 700 may be integrated with the HEVC standard by filtering edges in chroma coding blocks where $(((xCb/2+xDk)>>3)<<3)$ is equal to xCb/2+xDk in subclause 8.7.2.5.2 of ITU-T H.265, as follows:

The filtering process for edges in the chroma coding blocks of current coding unit consists of the following ordered steps:
1. The variable nD is set equal to 1<<(log 2CbSize−3).
2. For $yD_m$ equal to m<<2 with m=0 . . . nD−1 and $xD_k$ equal to k<<2 with k=0 . . . nD−1, the following applies:
   When $(((yCb/2+yD_m)>>3)<<3)$ is equal to $yCb/2+yD_m$, the following ordered steps apply:

FIG. 8 illustrates a method 800 for chroma deblock filtering according to another example embodiment. According to method 800, a flag may indicate the type of chroma deblocking to be performed on samples. For example, the type of chroma deblocking to be performed may be indicated in a slice header by setting a flag in the slice header to indicate whether to apply the default chroma deblock filtering scheme set forth in ITU-T H.265 or to apply another filtering scheme (e.g., luma deblocking) for chroma deblock filtering. In box 802, the method 800 may receive parameters defining how deblock filtering is to be performed. The method 800 may determine the type of chroma deblocking to perform based on a flag in a slice header. For example, a simple_chroma_filtering flag may be on when simple chroma filtering should be applied to the samples. If the method 800 determines in box 804 that simple chroma filtering is signaled in the metadata accompanying the video samples, the method may proceed to box 806, in which a simple chroma deblocking technique is used, for example the default chroma deblocking processes defined by the HEVC standard. If the method determines in box 804 that simple chroma filtering is not to be applied, it may apply another type of chroma deblock filter on the chroma samples, e.g., luma deblocking techniques or other predefinable deblocking techniques.

The principles of method 800 may be integrated with the HEVC standard by adding a simple_chroma_filtering flag in a slice segment header as defined by ITU-T H.265, as follows:

|  | Descriptor |
|---|---|
| slice_segment_header( ) { | |
| ... | |
|   if( deblocking_filter_override_enabled_flag ) | |
|     deblocking_filter_override_flag | u(1) |
|   if( deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|         simple_chroma_filtering | u(1) |
|     } | |
|   } | |
| ... | |
| } | |

The principles of method 800 may be integrated with subclause 8.5.2.5.1 of ITU-T H.265 follows:

The filtering process for edges in the chroma coding blocks of current coding unit consists of the following ordered steps:
1. The variable nD is set equal to 1<< (log 2CbSize−3).
2. For $xD_k$ equal to k<<2 with k=0 . . . nD−1 and $yD_m$ equal to m<<2 with m=0 . . . nD−1, the following applies:
   When $bS[xD_k*2][yD_m*2]$ is equal to 2 and $(((xCb/2+xD_k)>>3)<<3)$ is equal to $xCb/2+xD_k$, the following ordered steps apply:
   a. If simple_chroma_filtering is 1, the filtering process for chroma block edges as specified in subclause 8.7.2.5.5 is invoked, otherwise subclause 8.7.2.5.4 is invoked, with the chroma picture sample array recPicture$_{Cb}$, the location of the chroma coding block (xCb/2, yCb/2), the chroma location of the block (xD$_k$, yD$_m$), a variable edgeType set equal to EDGE_VER, and a variable cQpPicOffset set equal to pps_cb_qp_offset as inputs, and the modified chroma picture sample array recPicture$_{Cb}$ as output.

b. If simple_chroma_filtering is 1, the filtering process for chroma block edges as specified in subclause 8.7.2.5.5 is invoked, otherwise subclause 8.7.2.5.4 is invoked, with the chroma picture sample array recPicture$_{Cr}$, the location of the chroma coding block (xCb/2, yCb/2), the chroma location of the block (xD$_k$, yD$_m$), a variable edgeType set equal to EDGE_VER, and a variable cQpPicOffset set equal to pps_cr_qp_offset as inputs, and the modified chroma picture sample array recPicture$_{Cr}$ as output.

In this example, simple_chroma_filtering=1 may signal that a filtering process for chroma block edges as defined by subclause 8.7.2.5.5 in the HEVC standard is performed on a current chroma block. Simple_chroma_filtering=0 may signal that a filtering process for luma block edges is performed on the current chroma block. In an alternative embodiment, simple_chroma_filtering=0 may signal that a filtering process described herein is performed on the current chroma block. All other parameters and values in slice_segment_header( ) may have their meaning as defined by ITU-T H.265.

Any of the above-discussed embodiments can be practiced in combination. For example, the principles of performing chroma deblocking for both a 4×4 boundary and for boundary strengths greater than 0 may be integrated with subclause 8.7.2.5.1 of ITU-T H.265 as follows:

The filtering process for edges in the chroma coding blocks of current coding unit consists of the following ordered steps:

1. The variable nD is set equal to 1<<(log 2CbSize−3).
2. For xD$_k$ equal to k<<2 with k=0 . . . nD−1 and yD$_m$ equal to m<<2 with m=0 . . . nD−1, the following applies:
   When bS[xD$_k$*2][yD$_m$*2] is greater than 0, the following ordered steps apply FIG. 9 illustrates a multi-terminal system 900 suitable for use with embodiments of the present invention. The system 900 may include at least two terminals 910, 920 interconnected via a channel 950. For unidirectional transmission of data, a first terminal 910 may code video data at a local location for transmission to the other terminal 920 via the channel 950. The second terminal 920 may receive the coded video data of the other terminal from the channel 950, decode the coded data and display the recovered video data. Unidirectional data transmission is common in media streaming applications and the like.

FIG. 9 also illustrates a second pair of terminals 930, 940 provided to support bidirectional transmission of coded video that may occur, for example, during videoconferencing. For bidirectional transmission of data, each terminal 930, 940 may code video data captured at a local location for transmission to the other terminal via the channel 950. Each terminal 930, 940 also may receive the coded video data transmitted by the other terminal, may decode the coded data, and may display the recovered video data at a local display device.

In FIG. 9, the terminals 910-940 are illustrated as servers, personal computers and smart phones, but the principles of the present invention are not so limited. Embodiments of the present invention find application with laptop computers, tablet computers, media players and/or dedicated video conferencing equipment. Each terminal 910-940 may include a processing device and a memory. The processing device may include a device such as a central processing unit, microcontroller, or other integrated circuit that is configured to execute instructions stored in the memory. Memory may include any form of tangible media that is capable of storing instructions, including but not limited to RAM, ROM, hard drives, flash drives, and optical discs. The channel 950 represents any number of networks that convey coded video data among the terminals 910-940, including for example wire line and/or wireless communication networks. A communication network may exchange data in circuit-switched and/or packet-switched channels. Representative networks include telecommunications networks, local area networks, wide area networks and/or the Internet. In another embodiment, the channel 950 may be provided as a storage device, for example, an electrical, optical or magnetic storage device. For the purposes of the present discussion, the architecture and topology of the channel 950 is immaterial to the operation of the present invention.

The foregoing discussion has described operation of the embodiments of the present invention in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field-programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. Unless described otherwise herein, any of the methods may be practiced in any combination, e.g., interleaved. For example a first frame may be refined, and a second frame may be directly used without refinement, etc. The level of refinement may also be defined based on a region and differ from region to region based on regional interest.

We claim:

1. A decoding method, comprising: responsive to coded video data received from a channel, parsing the coded video data into portions representing coded Largest Coding Units (LCUs); and decoding coded data of the LCUs in a coding order, wherein the decoding of an LCU includes: decoding coded data of any Coding Units (CUs) contained in the respective LCU; and prior to a decoding of a next LCU, performing deblocking filtering along a seam between the respective LCU and an adjacent LCU that was decoded prior to the decoding of the respective LCU; wherein the performing includes:
  determining the seam is not an edge based on a calculation of a smoothness metric of a CU comprising data along the seam;
  responsive to the determination that the seam is not an edge, calculating a textureness metric of the respective LCU; responsive to a determination that the calculated textureness metric indicates that the seam is across a texture, lowering a deblocking filter strength to be applied for filtering of the seam; and responsive to a determination that the calculated textureness metric indicates that the seam is not across a texture, increasing the deblocking filter strength to be applied for filtering of the seam.

2. The method of claim 1, further comprising estimating a $\beta$ threshold value from a quantization parameter of the respective LCU; determining the seam is an edge responsive to a determination that the calculated smoothness metric of the respective LCU is greater than $\beta$.

3. The method of claim 1, wherein the seam is not filtered responsive to a determination that the respective LCU is an edge.

4. The method of claim 1, further comprising
  estimating a $t_c$ threshold value from a quantization parameter of the respective LCU;
  wherein the seam is determined to be across a texture responsive to a determination that the calculated textureness metric of the respective LCU is greater than $t_c$.

5. The method of claim 1, wherein respective strengths of the weak and strong filters are derived from corresponding strengths for a luma deblocking filter.

6. A computer system, comprising: at least one processor; at least one memory comprising instructions configured to be executed by the at least one processor to perform a decoding method comprising:
  responsive to coded video data received from a channel, parsing the coded video data into portions representing coded Largest Coding Units (LCUs); and
  decoding coded data of the LCUs in a coding order, wherein the decoding of an LCU includes: decoding coded data of any Coding Units (CUs) contained in the respective LCU; and
  prior to a decoding of a next LCU, performing deblocking filtering along a seam between the respective LCU and an adjacent LCU that was decoded prior to the decoding of the respective LCU;
  wherein the performing includes:
  determining the seam is not an edge based on a calculation of a smoothness metric of a CU comprising data along the seam;
  responsive to the determination that the seam is not an edge, calculating a textureness metric of the respective LCU;
  responsive to a determination that the calculated textureness metric indicates that the seam is across a texture, lowering a deblocking filter strength to be applied for filtering of the seam; and
  responsive to a determination that the calculated textureness metric indicates that the seam is not across a texture, increasing the deblocking filter strength to be applied for filtering of the seam.

7. The system of claim 6, further comprising estimating a $\beta$ threshold value from a quantization parameter of the respective LCU; determining the seam is an edge responsive to a determination that the calculated smoothness metric of the respective LCU is greater than $\beta$.

8. The system of claim 6, wherein the seam is not filtered responsive to a determination that the respective LCU is an edge.

9. The system of claim 6, further comprising
  estimating a $t_c$ threshold value from a quantization parameter of the respective LCU;
  wherein the seam is determined to be across a texture responsive to a determination that the calculated textureness metric of the respective LCU is greater than $t_c$.

10. The system of claim 6, wherein respective strengths of the weak and strong filters are derived from corresponding strengths for a luma deblocking filter.

11. A non-transitory computer-readable medium comprising instructions executable by at least one processor to perform a decoding method, the decoding method comprising:
  responsive to coded video data received from a channel, parsing the coded video data into portions representing coded Largest Coding Units (LCUs); and
  decoding coded data of the LCUs in a coding order, wherein the decoding of an LCU includes:
  decoding coded data of any Coding Units (CUs) contained in the respective LCU;
  and prior to a decoding of a next LCU, performing deblocking filtering along a seam between the respective LCU and an adjacent LCU that was decoded prior to the decoding of the respective LCU;
  wherein the performing includes:
  determining the seam is not an edge based on a calculation of a smoothness metric of a CU comprising data along the seam;
  responsive to the determination that the seam is not an edge, calculating a textureness metric of the respective LCU;
  responsive to a determination that the calculated textureness metric indicates that the seam is across a texture, lowering a deblocking filter strength to be applied for filtering of the seam; and
  responsive to a determination that the calculated textureness metric indicates that the seam is not across a texture, increasing the deblocking filter strength to be applied for filtering of the seam.

12. The medium of claim 11, further comprising estimating a $\beta$ threshold value from a quantization parameter of the respective LCU; determining the seam is an edge responsive to a determination that the calculated smoothness metric of the respective LCU is greater than $\beta$.

13. The medium of claim 11, wherein the seam is not filtered responsive to a determination that the respective LCU is an edge.

14. The medium of claim 11, further comprising
  estimating a $t_c$ threshold value from a quantization parameter of the respective LCU;
  wherein the seam is determined to be across a texture responsive to a determination that the calculated textureness metric of the respective LCU is greater than $t_c$.

15. The medium of claim 11, wherein respective strengths of the weak and strong filters are derived from corresponding strengths for a luma deblocking filter.

* * * * *